US012043255B2

(12) United States Patent
Münning et al.

(10) Patent No.: US 12,043,255 B2
(45) Date of Patent: Jul. 23, 2024

(54) METHOD FOR OPERATING A LANE-KEEPING ASSISTANCE SYSTEM OF A MOTOR VEHICLE WHICH IS AT LEAST PARTIALLY OPERATED WITH ASSISTANCE, COMPUTER PROGRAM PRODUCT, AND LANE-KEEPING ASSISTANCE SYSTEM

(71) Applicant: Volkswagen Aktiengesellschaft, Wolfsburg (DE)

(72) Inventors: Daniel Münning, Braunschweig (DE); Lukas Ackert, Frellstedt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 246 days.

(21) Appl. No.: 17/568,533

(22) Filed: Jan. 4, 2022

(65) Prior Publication Data

US 2022/0212663 A1 Jul. 7, 2022

(30) Foreign Application Priority Data

Jan. 5, 2021 (DE) .......................... 102021200023.1

(51) Int. Cl.
*B60W 30/12* (2020.01)
*B60W 50/00* (2006.01)
*B60W 50/14* (2020.01)

(52) U.S. Cl.
CPC ........ *B60W 30/12* (2013.01); *B60W 50/0097* (2013.01); *B60W 50/14* (2013.01);
(Continued)

(58) Field of Classification Search
CPC .. B60W 30/12; B60W 50/0097; B60W 50/14; B60W 2556/10; B60W 2556/45; B60W 2555/20; B60W 2552/05
See application file for complete search history.

(56) References Cited

U.S. PATENT DOCUMENTS

2014/0035832 A1 2/2014 Poulsen
2020/0110422 A1 4/2020 Takamatsu
(Continued)

FOREIGN PATENT DOCUMENTS

DE 102005052029 A1 5/2007
DE 102012214979 A1 2/2014
(Continued)

OTHER PUBLICATIONS

German Patent Appln. No. DE102021200023.1. Extended EP Search Report (May 24, 2022).
102021200023.1 Examination Report (Aug. 30, 2021).

*Primary Examiner* — Peter D Nolan
*Assistant Examiner* — Wae L Louie
(74) *Attorney, Agent, or Firm* — Peter Zura; LOZA & LOZA, LLP

(57) ABSTRACT

A lane-keeping assistance system of a motor vehicle, which is at least partially operated with assistance, in which an environment of the motor vehicle with a potential lane is detected via an optical detection device of the lane-keeping assistance system and evaluated via an electronic computing device of the lane-keeping assistance system and in which, as a function of the evaluated environment, an at least partially assisted lane-keeping movement is carried out by means of a transverse control device of the lane-keeping assistance system, wherein swarm data provided by an electronic computing device, which is external relative to the vehicle, are taken into account for evaluating the environment, wherein a future drivable route, which is outside of a detection area of the optical detection device, is evaluated on the basis of the swarm data, and a future partially assisted lane-keeping movement for the transverse control device is determined.

20 Claims, 1 Drawing Sheet

(52) U.S. Cl.
    CPC ..... *B60W 2552/05* (2020.02); *B60W 2555/20* (2020.02); *B60W 2556/10* (2020.02); *B60W 2556/45* (2020.02)

(56) References Cited

U.S. PATENT DOCUMENTS

| | | | |
|---|---|---|---|
| 2020/0133307 A1* | 4/2020 | Kelkar | G08G 1/0125 |
| 2020/0189598 A1* | 6/2020 | Eigel | B60W 10/20 |
| 2020/0312155 A1* | 10/2020 | Kelkar | B60W 60/005 |
| 2021/0034072 A1* | 2/2021 | Max | G05D 1/0293 |
| 2022/0153284 A1* | 5/2022 | Bruns | G01S 17/931 |
| 2022/0212663 A1* | 7/2022 | Münning | B60W 40/072 |
| 2022/0332316 A1* | 10/2022 | Münning | B60W 30/10 |

FOREIGN PATENT DOCUMENTS

| | | |
|---|---|---|
| DE | 102017203838 A1 | 9/2018 |
| DE | 102017208505 A1 | 11/2018 |
| DE | 102018203237 A1 | 9/2019 |
| DE | 102018205278 A1 | 10/2019 |
| DE | 102019114527 A1 | 2/2020 |
| DE | 102018221860 A1 | 7/2020 |
| EP | 3569465 A1 | 11/2019 |
| WO | 2017220286 A1 | 12/2017 |

* cited by examiner

METHOD FOR OPERATING A LANE-KEEPING ASSISTANCE SYSTEM OF A MOTOR VEHICLE WHICH IS AT LEAST PARTIALLY OPERATED WITH ASSISTANCE, COMPUTER PROGRAM PRODUCT, AND LANE-KEEPING ASSISTANCE SYSTEM

RELATED APPLICATIONS

The present application claims priority to German Pat. App. No. 10 2021 200 023.1 to Münning, et al., filed Jan. 5, 2021, the contents of which is incorporated by reference in its entirety herein.

TECHNICAL FIELD

The present disclosure relates to a method for operating a lane-keeping assistance system of a motor vehicle which is at least partially operated with assistance, in which an environment of the motor vehicle with a potential lane is detected using an optical detection device of the lane-keeping assistance system and evaluated using an electronic computing device of the lane-keeping assistance system, and in which, as a function of the evaluated environment, an at least partially assisted lane-keeping movement is carried out via a transverse control device of the lane-keeping assistance system, wherein swarm data provided by an electronic computing device external to the vehicle are taken into account for evaluating the environment. The present disclosure also relates to a computer program product and a lane-keeping assistance system.

BACKGROUND

Lane-keeping assistance systems are already known from the prior art which, in particular, provide transverse driver support. In particular, these transverse driver assistance systems can be referred to as Travel Assist and have a corresponding certification for road traffic. In previous implementations, the transverse guidance is substantially based on lanes coming from a camera, which, in particular, can also be referred to as a so-called live detection of lane markings. For example, on country roads with only one lane marking, detecting these markings by means of the camera can often be difficult, and a corresponding transverse guidance must be suppressed. It is also known that the motor vehicle is driven as centrally as possible inside the lane, in particular by means of the lane-keeping assistance systems.

DE 10 2019 114 527 A1 discloses a system and a method for extracting vehicle lane-related information from specific road segments by collecting data traces related to driving dynamics. One method for controlling the operation of a motor vehicle includes determining the location of the vehicle, identifying a road segment that corresponds to said location of the vehicle, and receiving outside-related data assigned to that road segment. An angle of rotation and a center line for the road segment are also determined. The vehicle data are evaluated, so are the vehicle locations and dynamics for several displays of the vehicles that are driving on the road segment. Trajectory data are determined, that indicate the starting points, end points and centerline offset distances for these vehicles. The total lanes are identified for the road segment by processing the trajectory data with a cluster ring algorithm that specifies the angle of rotation and the center line. The virtual trajectories for the lanes are extracted, and a vehicle bus system is instructed to carry out a control process based on an extracted virtual trajectory for at least one lane.

US 2014/0358322 A1 describes a method and an infrastructure for dealing with the problem of correspondence at the lane level. And various methods are presented therein for estimating position corrections, position and map matched confidence, self-correcting map matching, and turning and lane change events. In addition to the described algorithms, V2V data, if available, can be used to support all of the algorithm steps as discussed. If the relative GPS accuracy between the host vehicle and the remote vehicles in the proximity of the host vehicle is adequate for separating the vehicle inside the lane, and if there is an adequate number of vehicles in all lanes of interest, a determination is made as to the lane where the host vehicle is located.

SUMMARY

Aspects of the present disclosure are directed to a method, a computer program product, and a lane-keeping assistance system by means of which improved transverse guidance can be implemented in an at least partially assisted operation of the motor vehicle.

Various aspects are disclosed in the features of the independent claims. Other advantageous configurations are specified in the features of the dependent claims.

In some examples, a method is disclosed for operating a lane-keeping assistance system of a motor vehicle, wherein the motor vehicle is at least partially operated with assistance, and in which an environment of the motor vehicle with a potential lane is detected by means of an optical detection device of the lane-keeping assistance system and evaluated by means of an electronic computing device of the lane-keeping assistance system, and in which, as a function of the evaluated environment, an at least partially assisted lane-keeping movement is carried out by means of a transverse control device of the lane-keeping assistance system, wherein swarm data provided by an electronic computing device external to the vehicle are taken into account for evaluating said environment.

In some examples, a future drivable route, which may be located outside of the detection area of the optical detection device, is evaluated on the basis of the swarm data, and a future partially assisted lane-keeping movement for the transverse control device is determined.

In such configurations, swarm data can be used to carry out improved transverse guidance during an at least partially assisted operation of the motor vehicle. In particular, a future drivable route, which is to be traveled using the lane-keeping movement, can be evaluated accordingly. In particular, the swarm data originates from motor vehicles that have already traveled the same route. Thus, on the basis of the swarm data, already existing information can be utilized, whereby the future drivable route can then be evaluated accordingly and examined, for example, with regard to any assisted drivability thereof.

In some examples, corresponding swarm data may be used as a control source for future travel. For example, accordingly, on country roads with only one lane marking, the swarm data can be used, for example, to virtually mirror one lane along the route driven by other motor vehicles in order to accordingly arrive at two lanes, whereby transverse guidance of the motor vehicle can also be carried out for this section of the roadway. In particular, lane centering can thereby even be maintained in certain situations when, for example, only one line is known, and the mirroring can be carried out along said path being traveled whereby a second, virtual line can be generated. Furthermore, this way, it is possible to cross an intersection without any lines being present in that the vehicle simply "follows" the path taken by the other motor vehicles, in other words by following the swarm data.

Better forecasting is possible through the use of the swarm data, since, for example, the optical detection device, which may be configured as a camera, only has a detection range of 50 meters, based on the swarm data, a lane-keeping movement can even be planned accordingly for beyond this detection range.

The method presented herein is, in particular, a computer-implemented method. To this end, a further aspect of the present disclosure relates to a computer program product with program instructions which cause a method according to the preceding aspect to be carried out when the program instructions are processed by an electronic computing device. For this purpose, the electronic computing device has, in particular, circuits, in particular integrated circuits, and processors, as well as further electronic components, in order to be able to process the corresponding program instructions.

Yet another aspect of the present disclosure relates to a lane-keeping assistance system for a motor vehicle, which is at least partially operable with assistance, having at least one optical detection device and at least one electronic computing device, wherein the lane keeping assistance system is designed for carrying out a method according to the preceding aspect. In particular, the method is carried out by means of the lane-keeping assistance system.

Yet another aspect of the present disclosure relates to a motor vehicle with a lane-keeping assistance system according to the preceding aspect. In particular, the motor vehicle is designed to be at least partially assisted.

Advantageous embodied configurations of the method must be regarded as advantageous embodied configurations of the computer program product, the lane-keeping assistance system, and the motor vehicle. To this end, the lane-keeping assistance system and the motor vehicle have objective features enabling the method or an advantageous embodiment thereof to be carried out.

The present disclosure also includes improvements of the lane-keeping assistance system according to the present disclosure having features as they have already been described in connection with the improvements of the method according to the present disclosure. For this reason, the corresponding improvements of the method according to the present disclosure are not reiterated herein.

The present disclosure also comprises the combinations of the features of the described embodiments.

BRIEF DESCRIPTION OF THE DRAWINGS

Exemplary embodiments of the present disclosure are described below. To this end.

DETAILED DESCRIPTION

Figure 1:
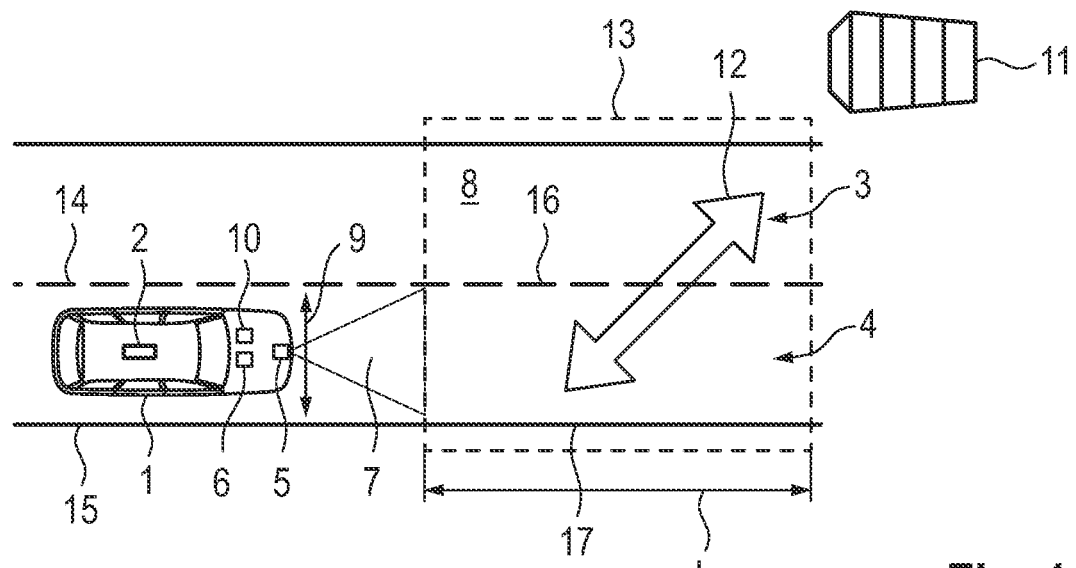
FIG. 1: shows schematic top view of an embodiment of a motor vehicle with an embodiment of a lane-keeping assistance system under some aspects of the present disclosure.

The exemplary embodiments explained below are preferred exemplary embodiments of the present disclosure. In the exemplary embodiments, the described components each represent individual features that are to be considered independently of one another, which also further develop the present disclosure independently of one another and are therefore also to be regarded as part of the present disclosure individually or in a combination other than the one shown. Furthermore, the described exemplary embodiments can also be supplemented by further features of the present disclosure already described.

In the figures, functionally identical elements are each provided with the same reference numerals.

In some examples detailed herein, at least a partially drivable length of the lane and/or a time inside the lane that is at least partially drivable with assistance is determined on the basis of swarm data, particularly without any detection of the lane by means of the optical detection device. If, for example, no lane has been detected by means of the camera in corresponding lanes, according to the prior art it is currently prohibited that in excess of, for example, 85 meters be guided using assistance means without having a corresponding optical detection. This distance can be extended accordingly by using the swarm data, since it can be determined, for example, that other motor vehicles have already driven several kilometers here, even without having the lane. The swarm data are thus used to be able to evaluate and extend a corresponding length of the given lane or time for the assisted movement. Improved transverse guidance can thus be implemented for a motor vehicle which is at least partially driving with assistance.

Furthermore, when determining a length and/or time, a current weather and/or a road type and/or an event and/or a driver status of a driver of the motor vehicle and/or a history of the swarm data may be taken into account. In particular, the different types of swarm data can be also be used even if, for example, there is only one live lane and one virtual lane available, or if there is no live lane and there are only two virtual lanes available. Thus, the permitted duration or the permitted route can be taken into account in the algorithm, as a function of the type of use of the used swarm data, among other things. The additional data can provide, for example, that a reliable determination of the length and duration of the use of the assisted movement can be carried out as a function of the respective environment.

In some examples, at least one criterion characterizing the lane is determined and predicted on the basis of the swarm data. For example, the characterizing criterion can be, for example, a curvature of a bend in the road and/or a lane center and/or a divider/median and/or a respective shoulder. Accordingly, on the basis of the swarm data, the virtual lane can thus be reliably generated, as a result of which a reliable, at least partially assisted lane-keeping movement can be carried out.

Furthermore, it may be advantageous for the availability of the lane-keeping assistance system to be determined depending on the predicted future, partially assisted movement and depending on the current and/or future position(s) of the motor vehicle. For example, a curvature in a bend of a road that is outside of the detection range of the camera can be detected at an early stage. If, for example, it is then predicted that it is not possible to implement any at least partially assisted lane-keeping movement within this curvature of a bend, this fact can also be ascertained. An evaluation of such an event can be determined, in particular, on the basis of the current position. Furthermore, such a situation can also be determined on the basis of the future position, for example, on the basis of a travel route.

If it is determined that the lane-keeping assistance system is not available, a warning message may be output for a driver of the motor vehicle. In particular, this alert is output at an early stage and before the motor vehicle reaches the location where a corresponding lane-keeping assistance system will no longer be available. This warning message can be output optically, as well as haptically or acoustically. Since the driver is informed at an early stage that a given lane-keeping assistance function will soon no longer be available, said driver can take over the driving operation himself. In particular, with, preferably, regularly updated distance or time information prior to reaching the corresponding location, the driver can be given precise information as to the point in time when he or she can no longer expect to be able to use the lane-keeping assistance system, thereby allowing the driver to get ready for taking over the steering operation. Thus, the safety of the lane-keeping assistance system is increased considerably, especially in comparison to purely camera-based solutions, as they are known today, which suddenly cease to be available and therefore require continuous attention from the driver.

In some examples, when it is determined that the lane-keeping assistance system is only available to a limited extent, a warning message may be output to the attention of a driver of the motor vehicle, wherein the warning message describes which assistance function of the lane-keeping assistance system is available for limited use. If, for example, a corresponding curve in the road is discovered, the driver can be informed, for example, that this curve in the road can only be navigated traveling a speed of 20 km/h while also maintaining the at least partially active assisted movement. Thus, the driver either has to decelerate the motor vehicle accordingly, or the assistance system must also carry out a longitudinal control. This information can, in turn, be communicated to the driver so that he or she be informed about the situation, or that, for example, said driver can take over the driving task at this point.

In some examples, the at least partially assisted route that is drivable in the future is taken into account when planning a route of the motor vehicle. If it is found, for example, that, for a given driving route, the corresponding transverse control can no longer be carried out, this fact can be taken into account during planning. If the driver wishes, for example, that the route be traveled with continuous transverse control, a corresponding further route can be determined that will preclude any non-availability of the transverse control.

FIG. 1 shows a schematic top view of an embodiment of a motor vehicle 1 with an embodiment of a lane-keeping assistance system 2. The motor vehicle 1 is located on a road 3. The road 3 in turn has a lane 4.

The lane-keeping assistance system 2 is configured for the motor vehicle 1, which is at least partially operated with assistance. For this purpose, the lane keeping assistance system 2 has an optical detection device 5, which is designed, in particular, as a camera. The lane-keeping assistance system 2 also has at least one electronic computing device 6. A detection area 7 can be detected with the camera 5. In particular, the lane 4 can be detected with the optical detection device 5 at least in some areas.

In this example, it is provided that an environment 8 of the motor vehicle 1, in particular the road 3 or the lane 4, is detected by means of the optical detection device 5 of the lane keeping assistance system 2. In particular, the environment 8 with the potential lane 4 is detected, and the environment 8 or the lane 4 is evaluated by means of the electronic computing device 6 of the lane-keeping assistance system. Depending on the evaluated environment 8, a partially assisted lane-keeping movement 9 takes place by means of a transverse control device 10 of the lane-keeping assistance system 2, wherein swarm data 12, as provided by an electronic computing device 11 that are external relative to the vehicle, are taken into account when evaluating the environment 8. On the basis of the swarm data 12, it is provided that, a future route 13 that will be traveled, which is outside the detection area 7 of the optical detection device 5, is evaluated and a future, partially assisted lane-keeping movement 9 for the transverse control device 10 is determined.

In the present case, it may be seen that, on the basis of the swarm data 12, an at least partially drivable length L of the lane 4 and/or at least partially
assisted drivable time in the lane 4 is determined without any direction of the lane 4 by means of the optical detection device 5.

In particular, it is shown in the present case that the road 3 has a median 14 or a divider, and a shoulder 15. The median 14 and the shoulder 15 were detected by means of the optical detection device 5. In particular, these are therefore live data. Outside of the detection area 7, in particular, a virtual center line 16 and a virtual shoulder 17 can be prognosticated on the basis of the swarm data 12.

On the basis of the swarm data 12, long distances, for example, distances of more than 85 meters, can be traveled with the aid of the assisted lane-keeping movement 9. In particular, since there are different types of usage of the swarm data 12, for example, a live lane plus a virtual lane, or no live lane and two virtual lanes, it is possible to consider the permitted duration or length L, inter alia, depending on the type of use of this swarm data 12 in the algorithm.

In some examples, when determining the length L and/or the time, current weather and/or a road type and/or an event, for example, a construction site, and/or a driver status of a driver of the motor vehicle 1, and/or a history of the swarm data 12 can be taken into account. A driver status is understood to mean, for example, whether the driver has his or her hands on the steering wheel, or a corresponding evaluation can be carried out on the basis of a driver-monitoring camera. Furthermore, in connection with the type of mirroring, for example, when determining the length L and/or the time, it is possible to take into account whether a line is present, or whether no line is present.

For example, if the weather is good, the motor vehicle 1 is traveling on a freeway, and there is no construction site, and although both lanes were not recognized, for example, the permitted length L can be limited to 5000 meters since the swarm data 12, however, matched the live data very well over a predetermined period of time. In a further example, if the weather is good, the motor vehicle 1 is traveling on a freeway, and there is no construction site, but a recognized lane is omitted, wherein the swarm data 12 matched the live data very well over a predetermined route, the permitted path for the lane-keeping movement 9 can also be released without restriction. As a third example, if, for example, bad weather, a freeway or a construction site were detected and a lane is missing at the same time, the swarm data 12 can already provide good matching with the live data over a predetermined length, whereby the distance for an assisted lane-keeping movement can be limited to 100 meters.

Figure 2:
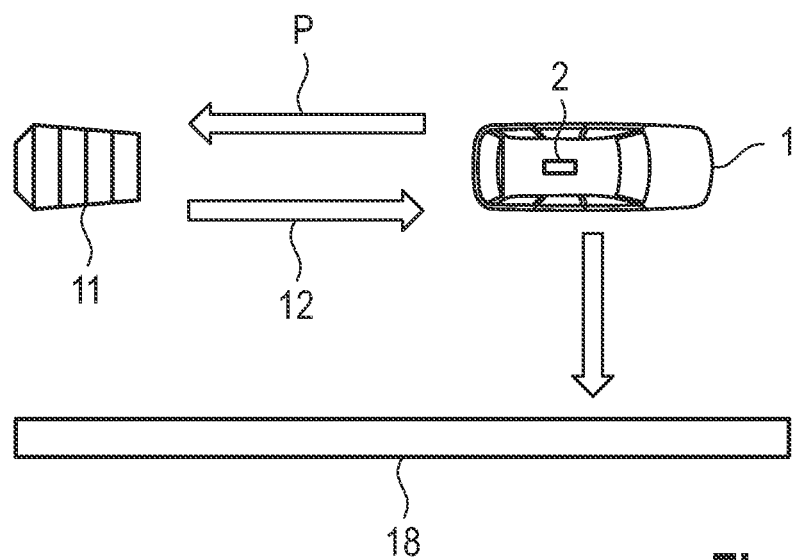
FIG. 2: shows another schematic top view of a further embodiment of a further motor vehicle with an embodiment of a further lane-keeping assistance system under some aspects of the present disclosure.

In a further schematic top view, FIG. 2 shows a further embodiment of the lane-keeping assistance system 2 in the motor vehicle 1. In the present case, it is shown, in particular, that an availability of the lane-keeping assistance system 2 can be determined as a function of the predicted future partially assisted lane-keeping movement 9 and as a function of the current and/or a future position P. For example, if it is determined that the lane-keeping assistance system 2 is not available, a warning message can be output alerting the driver of the motor vehicle 1. If it is determined that the lane-keeping assistance system 2 is only available to a limited extent, a warning message can be output alerting a driver of the motor vehicle 1, wherein the warning message describes which assistance function of the lane-keeping assistance system 2 is limited.

Furthermore, it can be provided that the at least partially assisted route that will be drivable in the future is taken into account when planning a route for the motor vehicle 1. For this purpose, in particular, the availabilities, the type of transverse guidance, speeds and weather can be made available, for example, by a navigation device 18 of the motor vehicle 1. For the route calculation of the navigation device 18, road sections are preferred, in particular, where it has been determined on the basis of the swarm data 12 that the lane-keeping assistance system 2 is in fact available and can therefore be used. For the usual route calculation algorithms, this is preferably done by adapting the weighting of the road section for the navigation route.

In some examples, the motor vehicle 1 may be driven, at least partially with assistance, as far as possible in the center of the lane by means of the lane-keeping assistance system 2. Using the swarm data 12, the lane centering guidance can continue to be maintained in certain situations. For example, if only one line was recognized, mirroring can be carried out along the path that is being traveled. A second virtual line can thus be generated. It is possible to drive across an intersection also, for example, without lines such as, for example, by following the path that was taken by other motor vehicles. If the motor vehicle 1 has the information available about the percentage of a route ahead that was already driven by other motor vehicles with an assistance system, this can be taken into account in the context of a navigation plan, for example.

In some examples, the proportion of possible transverse guidance can also be displayed to the driver in the navigation device 18. For example, a color scale can be output from red to green, wherein red means that lane-keeping assistance system 2 is available for less than 10% of the route, and green means that the lane-keeping assistance system 2 is continuously available, in particular over 90%.

In particular, speed data, detected lane markings, any use of lane-keeping assistance system 2 without swarm data 12 or any use of lane keeping assistance system 2 with swarm data 12 can be evaluated and also transmitted to electronic computing device 11, which is external to the vehicle, for evaluation. For this purpose, mirroring of, for example, one line or also of several lines can then be carried out.

The support to be expected can then be displayed on the navigation device 18 or on an output device, for example, on a screen, inside the motor vehicle 1, for example, on the basis of a color scale, or by way of dashed lines to display the route. Furthermore, such consideration can be given at the time when planning a route. Furthermore, for winding country roads, for example, information can be output to the driver alerting the driver that transverse guidance will no longer be available when driving through a curve. The swarm data 12 can therefore be used to provide for better forecasting and a warning function.

LIST OF REFERENCE NUMERALS 1 motor vehicle
2 lane-keeping assistance system
3 road
4 lane
5 optical detection device
6 electronic computing device
7 detection area
8 environment
9 lane-keeping movement
10 transverse control device
11 electronic computing device external to the vehicle
12 swarm data
13 future drivable route
14 median
15 shoulder
16 virtual median
17 virtual shoulder
18 navigation device
L length
P position

The invention claimed is:

1. A method for operating a lane-keeping assistance system of a motor vehicle which is at least partially operated with assistance, comprising:
   detecting, via an optical detection device of a lane-keeping assistance system, an environment of a potential lane of the motor vehicle within a configured optical detection area;
   evaluating the detected environment of the optical detection device, via an electronic computing device of the lane-keeping assistance system;
   processing swarm data received from an electronic computing device external to the vehicle prior to carrying out an at least a partially-assisted lane-keeping movement via a transverse control device;
   carrying out the at least a partially-assisted lane-keeping movement as a function of the evaluated environment within the configured detection area;
   further processing the swarm data while the at least a partially-assisted lane-keeping movement is carried out; and
   determining a future partially assisted lane-keeping movement for the transverse control device outside the configured optical detection area, based on the further processed swarm data.

2. The method according to claim 1, further comprising determining at least a partially drivable length the potential lane and/or an at least partially drivable time in the potential lane with assistance are/is determined on the basis of the swarm data, without detection of the optical detection device.

3. The method according to claim 2, wherein, determining the length and/or the time comprises determining one or more of a current weather, a road type, an event, a driver status of a driver of the motor vehicle, and/or a history of the swarm data.

4. The method according to claim 1, further comprising determining and predicting at least one criterion characterizing the lane on the basis of the swarm data.

5. The method according to claim 1, further comprising determining an availability of the lane-keeping assistance system, depending on the predicted future, partially assisted lane-keeping movement and depending on the current and/or future position.

6. The method according to claim 5, further comprising outputting a warning message if it is determined that the lane-keeping assistance system is not available.

7. The method according to claim 5, further comprising outputting a warning message if it is determined that the lane-keeping assistance system is only available to a limited extent, wherein the warning message describes which assistance function of the lane-keeping assistance system is limited.

8. The method according to claim 1, wherein the at least partially assisted route that is drivable in the future is taken into account when planning a route for the motor vehicle.

9. A lane-keeping assistance system for a motor vehicle, which is at least partially operable with assistance, comprising:
   at least one optical detection device;
   a transverse control device; and
   at least one electronic computing device, wherein the computing device, transverse control device and at least one optical detection device are configured to:
      detect, via the at least one optical detection device, an environment of a potential lane of the motor vehicle within a configured optical detection area;
      evaluate the detected environment of the optical detection device, via the electronic computing device of the lane-keeping assistance system;
      process swarm data received from an electronic computing device external to the vehicle prior to carrying out an at least a partially-assisted lane-keeping movement via a transverse control device;
      carry out the at least a partially-assisted lane-keeping movement as a function of the evaluated environment within the configured detection area;
      further process the swarm data while the at least a partially-assisted lane-keeping movement is carried out; and
      determine a future partially assisted lane-keeping movement for the transverse control device outside the configured optical detection area, based on the further processed swarm data.

10. The lane-keeping assistance system according to claim 9, wherein the computing device is configured to determine at least a partially drivable length the potential lane and/or an at least partially drivable time in the potential lane with assistance are/is determined on the basis of the swarm data, without detection of the optical detection device.

11. The lane-keeping assistance system according to claim 10, wherein the length and/or the time comprises determining one or more of a current weather, a road type, an event, a driver status of a driver of the motor vehicle, and/or a history of the swarm data.

12. The lane-keeping assistance system according to claim 9, wherein the computing device is configured to determine and predict at least one criterion characterizing the lane on the basis of the swarm data.

13. The lane-keeping assistance system according to claim 9, wherein the computing device is configured to determine an availability of the lane-keeping assistance system, depending on the predicted future, partially assisted lane-keeping movement and depending on the current and/or future position.

14. The lane-keeping assistance system according to claim 13, wherein the computing device is configured to output a warning message if it is determined that the lane-keeping assistance system is not available.

15. The lane-keeping assistance system according to claim 13, wherein the computing device is configured to output a warning message if it is determined that the lane-keeping assistance system is only available to a limited extent, wherein the warning message describes which assistance function of the lane-keeping assistance system is limited.

16. The lane-keeping assistance system according to claim 9, wherein the at least partially assisted route that is drivable in the future is taken into account when planning a route for the motor vehicle.

17. A computer program product comprising non-transitory program instructions which, when the program instructions are executed by an electronic computing device of a lane-keeping assistance system, cause the electronic computing device to:
   detect, via at least one optical detection device, an environment of a potential lane of the motor vehicle within a configured optical detection area;
   evaluate the detected environment of the optical detection device, via the electronic computing device of the lane-keeping assistance system;
   process swarm data received from an electronic computing device external to the vehicle prior to carrying out an at least a partially-assisted lane-keeping movement via a transverse control device;
   carry out the at least a partially-assisted lane-keeping movement as a function of the evaluated environment within the configured detection area;
   further process the swarm data while the at least a partially-assisted lane-keeping movement is carried out; and
   determine a future partially assisted lane-keeping movement for the transverse control device outside the configured optical detection area, based on the further processed swarm data.

18. The computer program product according to claim 17, further comprising determine at least a partially drivable length the potential lane and/or an at least partially drivable time in the potential lane with assistance are/is determined on the basis of the swarm data, without detection of the optical detection device.

19. The computer program product according to claim 18, wherein the length and/or the time comprises determining one or more of a current weather, a road type, an event, a driver status of a driver of the motor vehicle, and/or a history of the swarm data.

20. The computer program product according to claim 17, further comprising determine and predict at least one criterion characterizing the lane on the basis of the swarm data.

* * * * *